3,536,999
STRIP SAG GAGE IN A PICKLING BATH
Hans Mandler and Hans Weinzinger, Linz, Austria, assignors to Vereinigte Osterreichische Eisen- und Stahlwerke Aktiengesellschaft, Linz, Austria
Filed Apr. 30, 1968, Ser. No. 725,319
Claims priority, application Austria, May 16, 1967,
A 4,523/67
Int. Cl. G01n 27/02
U.S. Cl. 324—65                                      4 Claims

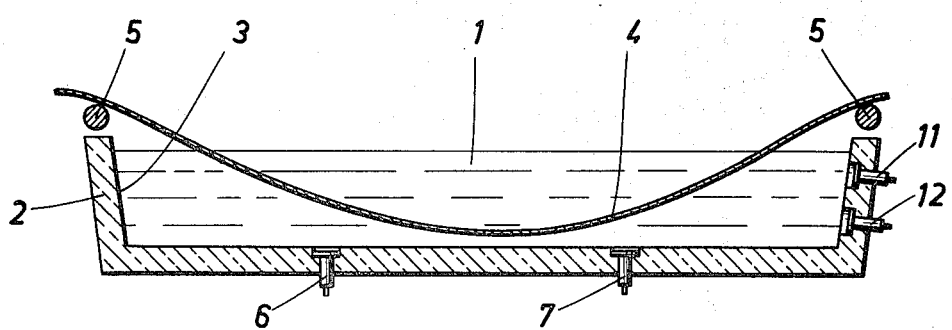
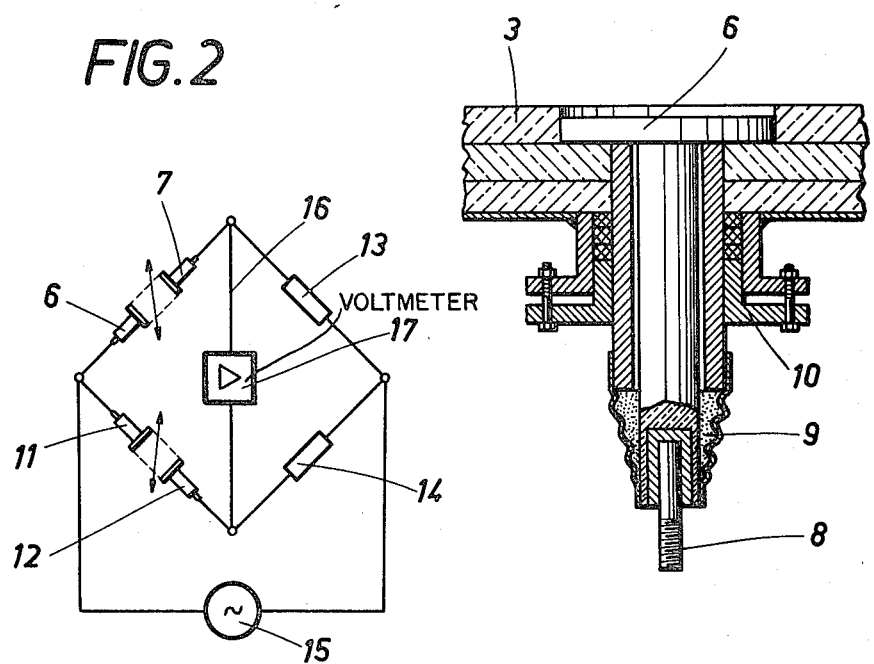

ABSTRACT OF THE DISCLOSURE

Means are provided to guide a metal strip in a predetermined direction substantially along a predetermined path of travel through a pickling bath in a container. At least two sensing electrodes are disposed in said container and spaced apart in said predetermined direction. All said electrodes are contacted by said bath. A measuring circuit connects a source of current to said sensing electrodes and is arranged to measure the total electrical resistance of the bath between one of said sensing electrodes and said strip immersed in said bath and between said strip and another of said electrodes, which resistance is related to the depth of immersion of said strip in said bath.

---

In the operation of continuous pickling lines, the automatic control of a predetermined depth of immersion of the strip corresponding to a certain sag and length of immerision of the strip is an important requirement for an economical operation of the plant.

The depth of immersion of the strip has previously been determnied with the aid of mechanical sensing means having feelers which contact the strip, or non-contacting measuring means in the form of magnetic probes or X-ray or isotopic barriers.

All these means exhibit various disadvantages in operation. Mechanical sensing means are subject to considerable wear and are often damaged by the running strip in continuous operation, particularly by the projections which are present adjacent to the tacked joints between successive lengths of strip. Besides, mechanical sensing means have a relatively long response time constant so that they cannot initiate fast control operations in response to a change of the sag of the strip. The non-contacting measuring means have also various disadvantages. Magnetic probes have only a relatively small range owing to the small extent of the field so that there will be no exact measurement of the sag of the strip in the case of relatively large variations thereof. Whereas X-ray and isotopic barriers give highly exact results of measurement, the electronic part of such systems is susceptible to trouble. Besides, the probes immersed into the pickling bath are highly endangered by the latter. A considerable structural expenditure is required to protect the entire plant from the action of acid and of elevated temperature.

It is an object of the present invention to provide an apparatus for measuring the sag of metal strip and the like in a strip pickling plant, which apparatus is simple in structure, reliable in operation, and enables a fast and reliable measurement of the sag of the strip at any time.

In an apparatus of the kind described, this object is accomplished by spacing apart at least two electrodes in the direction of travel of the metal strip in the pickling bath, preferably at the bottom of the container for the pickling bath. The electrodes are connected by a measuring circuit to the two terminals of a source of current so that the resistance of a circuit portion leading from one electrode via a portion of the bath to the strip and from the latter via another portion of the strip to the second electrode is direcly measured and/or used for controlling the feeding of the strip, said resistance being proportional to the depth of immersion of the strip.

The arrangement according to the invention is based on the recognition that the resistance of the liquid columns between the electrodes and the strip is directly proportional to the sag of the strip because the resistance of the strip itself is negligible, owing to the high electrical conductivity of the strip. To minimize an evolution of gas at the electrodes due to electrolysis, it is recommendable to use alternating current for measuring the resistance.

According to a preferred feature of the invention, the electrodes have large surfaces so that small current densities are obtained, and the electrodes consist of porous material, particularly porous graphite or sintered metal. The porous surface of such electrodes will ensure virtually constant contact resistances between the electrodes and the bath liquid even when sludge or the like residues have been deposited on the outside of the electrode, or gas bubbles are formed at a small rate on the surface by electrolysis. The bath containers are usually lined with ceramic material having a high electrical insulation value so that there is no danger of a short circuit between the electrodes over the lining of the bath. To protect the electrodes from mechanical damage by the strip, the electrodes may be disposed in recesses of the lining of the container for the pickling bath so that the strip will slide over the electrodes without mechanically contacting the same even when the strip has been torn.

In accordance with another preferred feature of the invention, two electrodes are disposed in the bath outside the path of travel of the strip and are included in a compensating circuit which forms part of the measuring circuit, preferably in opposition to the sensing electrodes. This arrangement serves as an automatic compensation of changes of the electrical conductivity of the bath liquid. In practice, the sensing electrodes can be included in one branch of an A.C. bridge circuit and the compensating electrodes in an equal and opposite branch of said bridge circuit.

The invention is illustrated by way of example in the accompanying drawing, in which:

FIG. 1 is a diagrammatic sectional view showing a strip pickling plant,

FIG. 2 is a circuit diagram of an apparatus according to the invention and

FIG. 3 a sectional view showing a measuring electrode in installed position.

The strip pickling plant comprises a bath container 2, which is partly filled with a pickling bath 1 and has an inside surface 3 formed by a ceramic lining. A metal strip 4 is continuously fed to the pickling bath 1. The length of immersion of the strip 4, which runs over guide rollers 5, depends on the depth of immersion of the strip. Two sensing electrodes 6, 7 are disposed in the bottom of the container at longitudinally spaced points. As is shown particularly in FIG. 3, the electrodes are disposed in recesses formed in the lining 3. The electrodes have a large, porous surface and consist preferably of porous graphite or sintered metal. To ensure a correct measurement, a terminal pin 8 of the same material as the electrodes extends outwardly through an insulating tube 9. A stuffing-box 10 prevents escape of liquid.

In addition to the electrodes 6, 7, two further electrodes 11, 12 are provided, which are disposed outside the path of travel of the strip and are contained in recesses in a side wall of the container 2. It is apparent from FIG. 2 that the electrodes 6, 7 are included in one branch and the electrodes 11, 12 in an equal and opposite branch of an A.C. measuring bridge circuit. Resistors 13, 14 are also included in said bridge circuit and selected to ensure a balancing of the bridge circuit when the strip has the desired sag. The bridge circuit is fed by an A.C. source 15. As the electrical resistance of the strip 4 is negligibly small, the electrical resistance between the electrodes 6, 7 is directly proportional to the sum of the distances measured along the shortest line between each of the electrodes 6 and 7 and the strip 4. The compensating electrodes 11, 12 ensure that changes in the resistance of the bath due to changes of the density or temperature of the bath will not affect the measurement. A change of the sag of the strip will result in a change of the electrical resistance between the electrodes 6 and 7 so that the voltage existing across the diagonal 16 of the bridge circuit is proportional to the change of the sag.

This voltage can be measured with a measuring instrument 17 or may be used directly to control signal generators, alarms or devices for controlling the feed movement of the strip so that the predetermined sag of the strip is restored.

What is claimed is:

1. In a strip pickling plant, which comprises a container holding a pickling bath, means for guiding a metal strip in a predetermined direction along a sagging path through the bath in the container, and a means for gaging the sag of the metal strip in the bath, the improvement of said strip sag gaging means including:
   (1) two sensing electrodes disposed in said container and spaced apart along said path in contact with the bath and at a distance from the strip determined by the sag,
   (2) a source of current, and
   (3) a measuring circuit connecting the source of current to the sensing electrodes,
   (a) the bath between each of said electrodes and the strip forming an electrical resistance directly proportional to said distance, and
   (b) the circuit measuring the electrical resistance, which indicates the sag of the metal strip.

2. The improvement in a strip pickling plant recited in claim 1, further comprising means responsive to the measurement of the electrical resistance.

3. The improvement in a strip pickling plant recited in claim 1, wherein the container has a bottom towards which the metal strip sags and the sensing electrodes have a relatively large surface area and consist of a porous material selected from the group consisting of porous graphite and sintered metal.

4. The improvement in a strip pickling plant recited in claim 1, further comprising an electrically nonconductive lining in said container, the lining defining recesses, and the sensing electrodes being countersunk in said lining recesses.

References Cited

UNITED STATES PATENTS

| | | | |
|---|---|---|---|
| 2,289,687 | 7/1942 | Stuart | 324—30 X |
| 2,512,372 | 6/1950 | Pakala | 318—306 |
| 2,661,009 | 12/1953 | Dunnegan et al. | 134—10 |
| 2,927,871 | 3/1960 | Mancke et al. | 134—10 |
| 2,971,154 | 2/1961 | Lerner | 324—61 |
| 3,095,463 | 6/1963 | Chang et al. | 134—57 X |
| 3,223,608 | 12/1965 | Hersch | 204—195 |
| 3,373,351 | 3/1968 | Rak | 204—30 |

EDWARD K. KUBASIEWICZ, Primary Examiner

U.S. Cl. X.R.

134—57